(12) United States Patent
Hollinger et al.

(10) Patent No.: US 6,702,347 B1
(45) Date of Patent: Mar. 9, 2004

(54) INTEGRATED MOUNTING SYSTEM FOR THE BUMPER, RECOVERY RINGS AND WINCH OF A MOTOR VEHICLE

(75) Inventors: R. Donald Hollinger, Bloomfield, MI (US); David W. Verburgt, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/375,502

(22) Filed: Feb. 26, 2003

(51) Int. Cl.[7] .............................................. B60R 19/04
(52) U.S. Cl. ...................... 293/155; 293/117; 293/116; 293/102
(58) Field of Search ................................ 293/155, 117, 293/116, 102; 296/193.09, 203.02; 414/462; 280/402, 507; 248/499; 70/259; 254/323

(56) References Cited

U.S. PATENT DOCUMENTS

| | | | |
|---|---|---|---|
| 3,740,079 A | | 6/1973 | Skinner |
| 3,754,784 A | * | 8/1973 | Heinig et al. ................ 293/155 |
| 3,794,227 A | | 2/1974 | Stearns |
| 3,862,669 A | * | 1/1975 | Lindbert et al. ............. 293/117 |
| 3,880,455 A | * | 4/1975 | Toemmeraas ................ 293/155 |
| 3,881,751 A | | 5/1975 | Colby |
| 3,947,062 A | * | 3/1976 | Pierce ......................... 293/116 |
| 4,073,508 A | * | 2/1978 | George et al. ............ 280/478.1 |
| 4,230,253 A | * | 10/1980 | Enright et al. .............. 228/152 |
| 4,331,323 A | * | 5/1982 | Sekimori et al. ............ 293/117 |
| 4,646,952 A | | 3/1987 | Timmers |
| 4,738,464 A | | 4/1988 | Putnam |
| 4,753,560 A | * | 6/1988 | Ryder .......................... 293/155 |
| 4,809,924 A | * | 3/1989 | Martens et al. .............. 293/117 |
| 4,829,979 A | * | 5/1989 | Moir ........................... 293/155 |
| 4,950,010 A | * | 8/1990 | Denny ......................... 293/117 |
| 5,433,356 A | * | 7/1995 | Russell ........................ 224/519 |
| 5,560,631 A | * | 10/1996 | Salvo .......................... 280/507 |
| 5,595,007 A | * | 1/1997 | Biance .......................... 37/268 |
| 5,785,367 A | * | 7/1998 | Baumann et al. ........... 293/155 |
| 5,791,633 A | | 8/1998 | Walker |
| 5,854,832 A | * | 12/1998 | Dezonno ............... 379/265.07 |
| 5,873,595 A | * | 2/1999 | Hinte .......................... 280/504 |
| 6,364,384 B1 | * | 4/2002 | Kemp et al. ................. 293/155 |
| 2002/0047247 A1 | * | 4/2002 | Moss .......................... 280/504 |
| 2002/0047281 A1 | * | 4/2002 | Hartel et al. ................ 293/102 |
| 2002/0113447 A1 | * | 8/2002 | Frank .......................... 293/155 |
| 2002/0140206 A1 | * | 10/2002 | Lloyd ...................... 280/491.5 |
| 2003/0034661 A1 | * | 2/2003 | Gotanda et al. ............. 293/155 |

* cited by examiner

Primary Examiner—Kiran Patel
(74) Attorney, Agent, or Firm—Laura C. Hargitt

(57) ABSTRACT

An integrated mounting system for mounting the bumper, recovery rings and a selectively removable winch to the frame of a motor vehicle. Left and right mounting plates are attached to the front ends of the left and right frame rails, wherein each mounting plate has a plate aperture. Left and right mounting brackets each have a bracket aperture formed in a planar base and a clevis perpendicularly upstanding in relation to the base. The front bumper also has a pair of bumper apertures. With the apertures aligned, the left and right mounting brackets are attached, respectively, to the left and right mounting plates, the bumper being sandwiched therebetween. Recovery rings are attached pivotally by a connector to each clevis. Removing a recovery ring allows a winch stinger to be received into the bracket, bumper and plate apertures at the selected mounting bracket, and be secured thereto via the connector at the clevis.

6 Claims, 4 Drawing Sheets

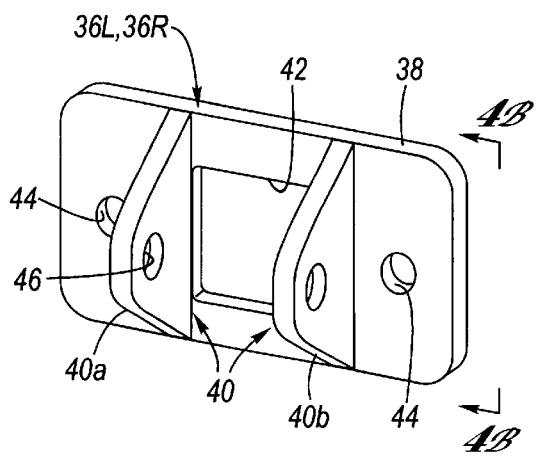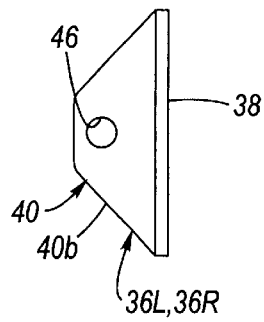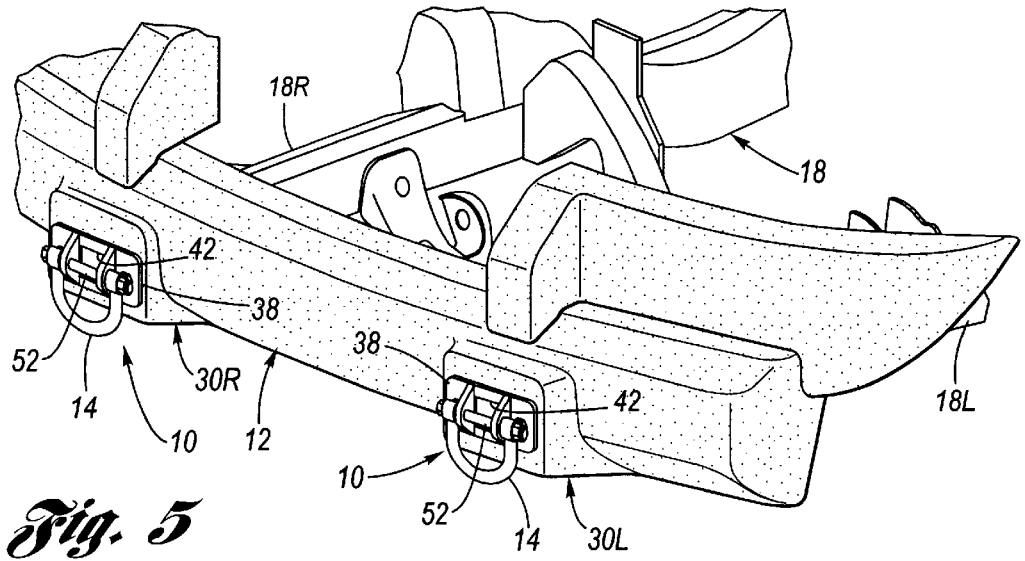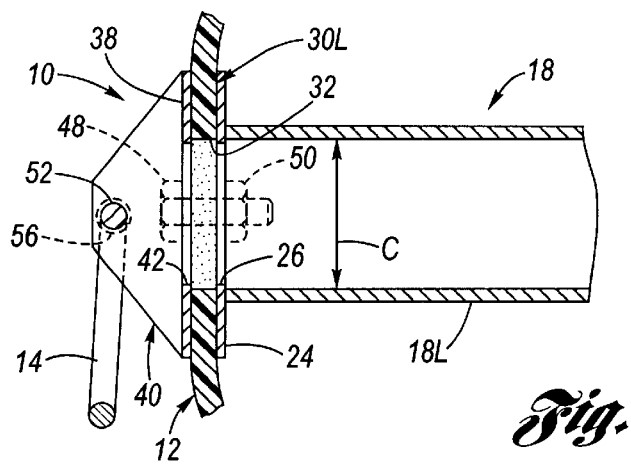

INTEGRATED MOUNTING SYSTEM FOR THE BUMPER, RECOVERY RINGS AND WINCH OF A MOTOR VEHICLE

TECHNICAL FIELD

The present invention relates to motor vehicles, particularly pick-up trucks and sport utility vehicle motor vehicles. Still more particularly, the present invention relates to an integrated mounting system for mounting the front bumper, recovery rings and a selectively deployable winch to the frame of the aforementioned type of motor vehicle.

BACKGROUND OF THE INVENTION

Conventionally, bumpers are attached to the vehicle frame using a number of bolts and assorted brackets.

Recovery rings have become an essential part of an "off-road" package for motor vehicles. Recovery rings are utilized as anchor points for towing or vehicle recovery in the event the vehicle has become immobilized by an untoward driving incident (for example being stuck in a ditch). In a typical installation, as depicted at FIG. 1, the recovery rings 110 are pivotally connected to respective brackets 112, which are, in turn, mounted to the left and right frame rails 114L, 114R of the vehicle frame 114.

Winches have been developed which are mechanically and electrically interfaced with a motor vehicle, for example to provide extrication from an immobilization caused by an untoward incident. Many experts advise motor vehicles that are used for off-road excursions be equipped with winches to provide self-recovery of the motor vehicle should an untoward event happen. The best location for a winch is the front of the motor vehicle.

As shown at FIG. 1, an improvement to motor vehicle winches 120 is the utilization of a trailer hitch attachment 122 therefor which permits the winch to be stowed when not in use and easily deployed when needed. In this regard, the winch has a stinger 124 which is received into the square receptacle 126 of the trailer hitch 122, and a pin 128 (held by a cotter pin 130) secures the placement of the stinger in the receptacle. Because winch strength can exceed recommended trailer hitch loads, the hitch utilized for winch purposes is usually more robust than a conventional trailer hitch. To accommodate the high loads that can be generated by winch operation, the trailer hitch is attached to the vehicle frame 114 via a special cross-member 132 which spans the left and right frame rails 114L, 114R. The attachment of the winch 120 is via various brackets and reinforcements at a central location of the cross-member 132, wherein the winch connects to the trailer hitch 122 at a location vertically below the bumper (not shown in FIG. 1 for clarity).

Problematically, the conventional trailer hitch winch attachment modality involves an excessive amount of weight associated with the cross-member and the bracketry, and a low ground clearance and approach angle—all of which contributing to reduced road performance of a motor vehicle so equipped.

Accordingly, what remains needed is to somehow integrate the bumper, recovery rings and winch mountings of a motor vehicle so as to thereby save weight and improve both the ground clearance and the winch approach angle.

SUMMARY OF THE INVENTION

The present invention is an integrated mounting system for mounting the bumper, recovery rings and a selectively removable winch to the frame of a motor vehicle, wherein the system saves weight and improves both the ground clearance and the winch approach angle as compared to conventional mounting modalities.

The integrated mounting system according to the present invention includes left and right mounting plates attached transversely to the front ends of the left and right frame rails of the motor vehicle frame wherein each mounting plate has a plate aperture, and left and right mounting brackets, each provided with a bracket aperture. The left and right mounting brackets each have a planar base and a clevis perpendicularly upstanding in relation to the base. Attachment holes are provided in each of the left and right mounting plates and mounting brackets. The front bumper also has a pair of bumper apertures and is also provided with attachment holes.

In operation, the left and right mounting plates are welded to the front end, respectively, of each of the left and right frame rails. Next, the rear surface of the front bumper is placed in abutting relation to the left and right mounting plates. The base of the left and right mounting brackets is placed in respective direct alignment with the left and right mounting plates in abutment of the front surface of the bumper. At this position, the plate, bracket and bumper apertures are aligned at each of the left and right frame rails, respectively. Bolts are now placed through the left and right mounting brackets, bumper and left and right mounting plates and nuts threadingly tightened thereunto, thereby simultaneously attaching to the motor vehicle frame the front bumper and mounts for recovery rings and a winch.

Next a recovery ring is attached to each clevis, using a bolt and nut combination, or a pin and cotter pin combination. In the event a winch is needed, the user removes a selected one of the recovery rings, and then places the stinger of the winch through the aligned bracket and plate apertures, and the bolt or pin of the recovery ring then placed through the clevis and a securement hole of the stinger to thereby hold the winch in place. The user then connects the winch to an electrical connection and thereupon actuates the winch as needed, as for example to recover the motor vehicle for an untoward driving incident. It will be noted that the winch is stabilized relative to the frame rail at which it is located via a slidable, yet snug fit between the stinger with the two aligned and spaced apart plate and bracket apertures. When completed, the winch is removed and again stored; and the recovery ring is then reinstalled.

Accordingly, it is an object of the present invention to provide an integrated mounting system for mounting the bumper, recovery rings and a selectively removable winch to the frame of a motor vehicle.

This and additional objects, features and advantages of the present invention will become clearer from the following specification of preferred embodiments.

BRIEF DESCRIPTION OF THE DRAWINGS

FIG. 4A is a perspective view of a mounting bracket according to the present invention.

FIG. 4B is a side view, seen along line 4B—4B of FIG. 4A.

FIG. 5 is a perspective view of a motor vehicle frame, wherein the left and right frame rails are provided, respectively, with left and right mounting brackets and the front bumper is located thereat as in FIGS. 2 and 3, wherein now left and right mounting brackets are attached, respectively to the left and right mounting brackets and bumper sandwiched therebetween.

FIG. 6 is a partly sectional side view, seen along line 6—6 of FIG. 5.

DESCRIPTION OF THE PREFERRED EMBODIMENT

Figure 1:
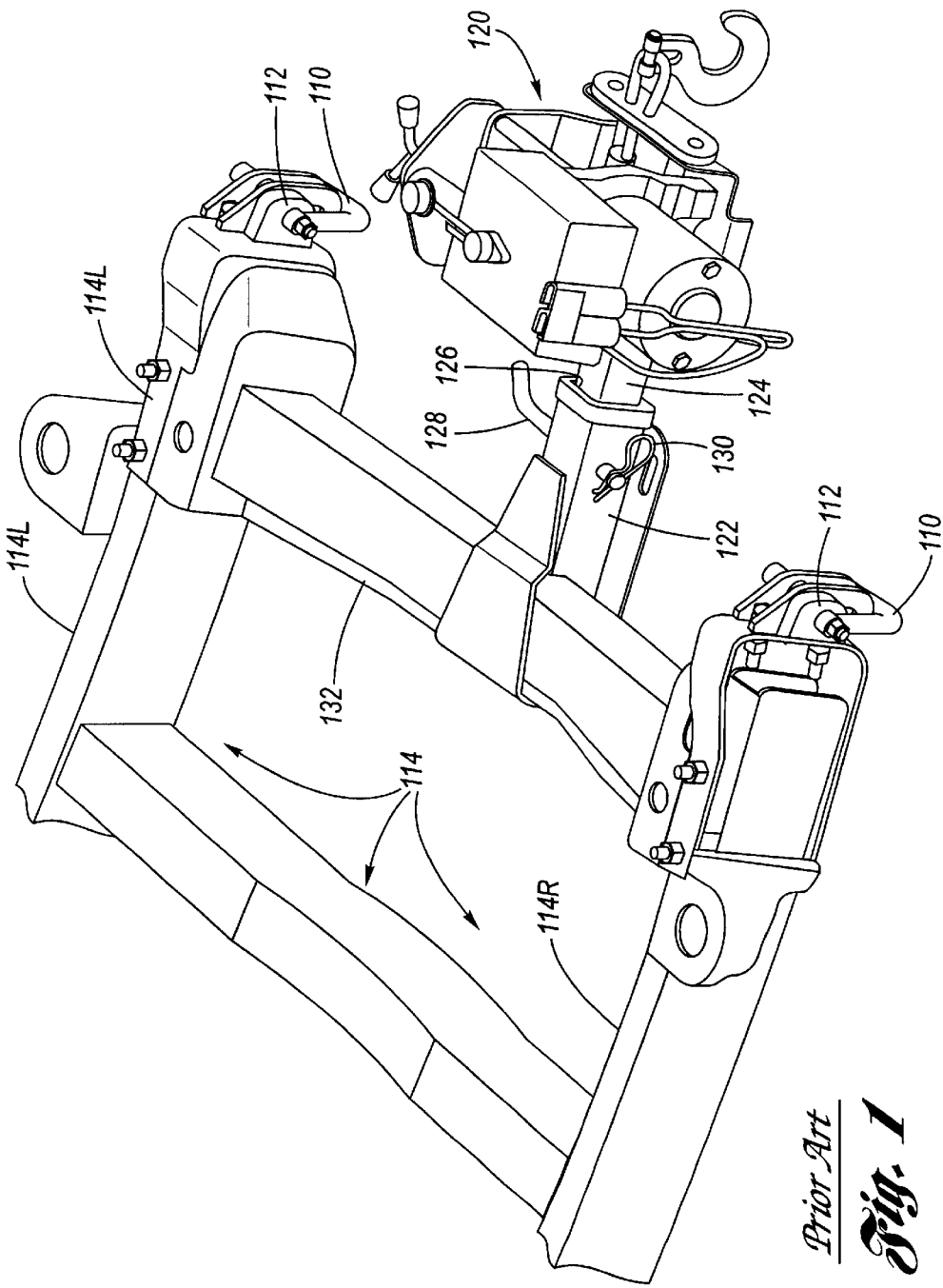
FIG. 1 is a perspective view of a prior art motor vehicle frame equipped with left and right recovery rings and trailer hitch mounted winch.

Referring now to the drawings, FIGS. 2 through 8 depict the integrated mounting system 10 (see FIGS. 5 and 6) according to the present invention for mounting a front bumper 12 (see FIG. 3), recovery rings 14 (see FIGS. 5, 6 and 7) and a selectively removable winch 16 (see FIG. 8) to the motor vehicle frame 18 of a motor vehicle 20.

Figure 2:
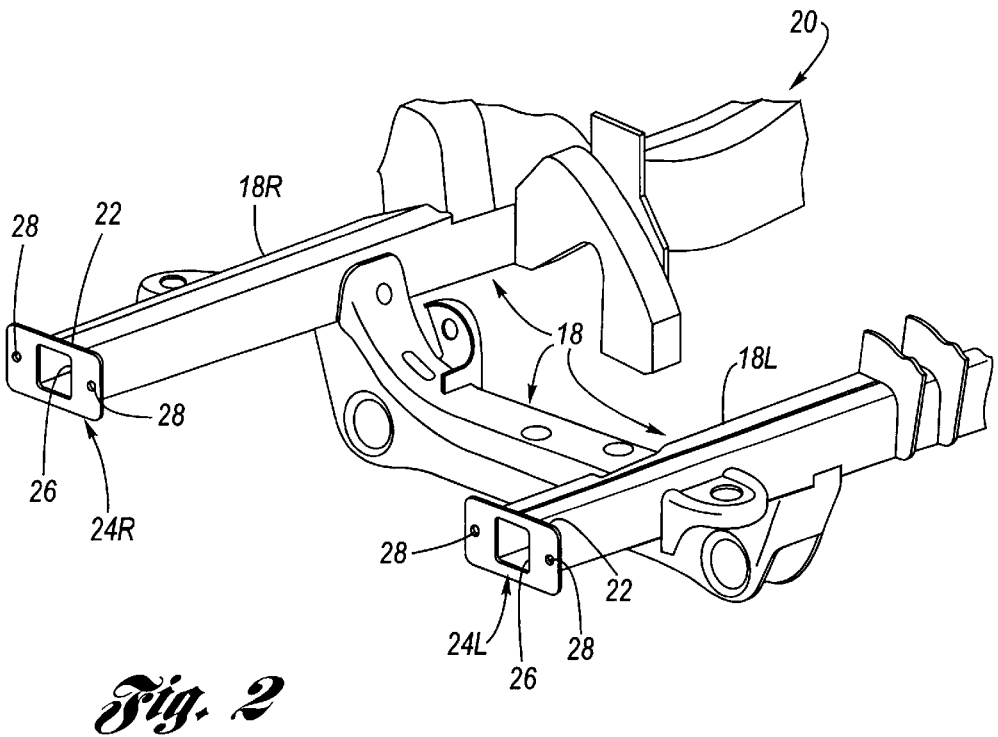
FIG. 2 is a perspective view of a motor vehicle frame, wherein the left and right frame rails are provided, respectively, with left and right mounting brackets.

Referring now to FIG. 2, the motor vehicle frame 18 has left and right frame rails 18L, 18R, each respectively having a front end 22. A left and right-mounting plate 24L, 24R is welded, respectively, in transverse relation to each of the left and right frame rails 18L, 18R at the front end 22 thereof. Each of the left and right mounting plates 24L, 24R has a plate aperture 26. Attachment holes 28 are provided in each of the left and right mounting plates 24L, 24R, one attachment hole being located at opposite sides of the plate aperture 26. It will be noticed that the plate apertures 26 communicate with an open space S of the left and right frame rails 18L, 18R, which have a cross-sectional area C at least as large as the cross-sectional area of the plate apertures (see in particular FIG. 6).

Figure 3:
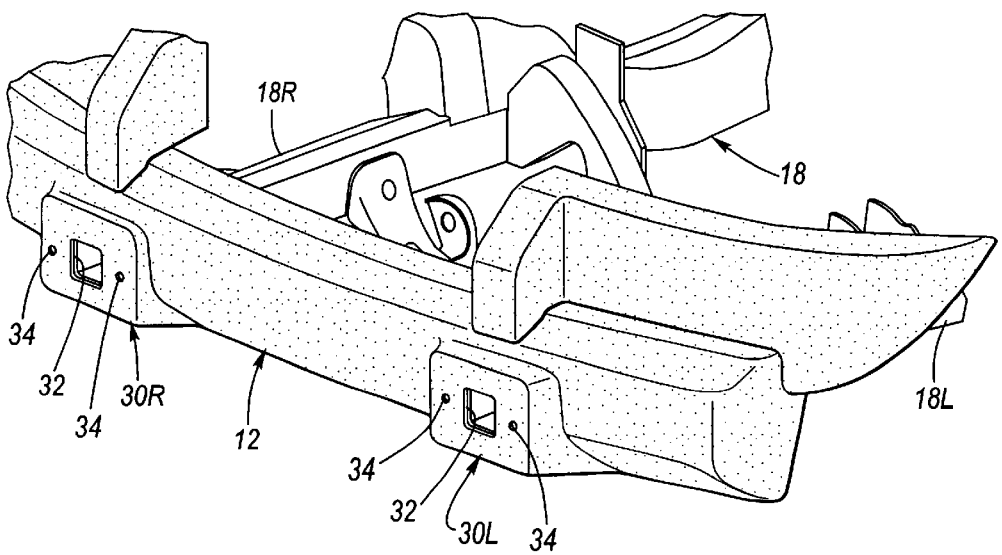
FIG. 3 is a perspective view of a motor vehicle frame, wherein the left and right frame rails are provided, respectively, with left and right mounting brackets as in FIG. 2, but now the front bumper is located abuttingly thereat.

FIG. 3 depicts the above referenced front bumper 12 now located for final installation. The front bumper 12 has left and right mounting features 30L, 30R, wherein the rear side thereof abuts, respectively, the left and right mounting plates 24L, 24R. A bumper aperture 32 is provided in each of the left and right mounting features 30L, 30R, and provided as well are a pair of attachment holes 34, one attachment hole on each side of the bumper aperture. Each bumper aperture 32 is the same size or a little larger than, the plate apertures 26. The placement of the front bumper 12, as shown at FIG. 3, aligns, at each of the left and right frame rails 18L, 18R, the bumper and mounting plate apertures 32, 26, as well as aligns the attachment holes 34, 28 associated respectively therewith.

FIGS. 4A and 4B depict identical left and right mounting brackets 36L, 36R, each having a planar base 38 and a clevis 40 which is connected (as for example by welding) to the base in perpendicular upstanding relation thereto. Between the projections 40a, 40b of the clevis 40 of each of the left and right mounting brackets 36L, 36R is formed a bracket aperture 42, wherein the bracket apertures have identically the same dimensions as the plate apertures 26. Attachment holes 44 are provided in each of the left and right mounting brackets 32L, 32R, one attachment hole on either side of the bracket aperture 42. Each of the projections 40a, 40b of the clevis 40 has a mutually aligned mounting hole 46.

FIG. 6 exemplifies how the front bumper 12 is finally installed, further to the locating thereof as depicted at FIG. 3. The base 38 of each of the left and right mounting brackets 36L, 36R is abutted to the outside surface of each of the left and right mounting features 30L, 30R, respectively. In this regard, at each of the left and right frame rails 18L, 18R, the bracket aperture 42, the bumper aperture 32 and the plate aperture 26 respectively thereat are mutually aligned, and wherein the bolts holes 44, 34, 28 are simultaneously also mutually aligned. A fastener, preferably a bolt 48, is now placed through the aligned attachment holes 44, 34, 28 of the left and right mounting brackets 36L, 36R, the front bumper 12 and left and right mounting plates 24L, 24R and a nut 50 is threadingly tightened onto each of the bolts, respectively. It will be appreciated that this final installation step has integrated the front bumper 12 to the motor vehicle frame 18, while simultaneously providing mountings for recovery rings 14 and a winch 16, as will be understood by further reference to the drawings at FIGS. 7 and 8.

Figure 7:
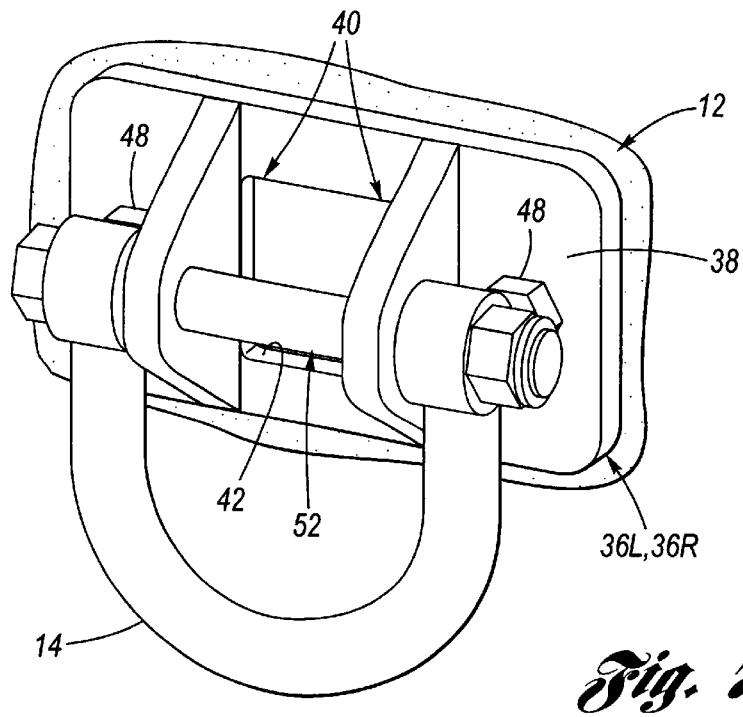
FIG. 7 is a perspective view of a mounting bracket equipped with a recovery ring.
Figure 8:
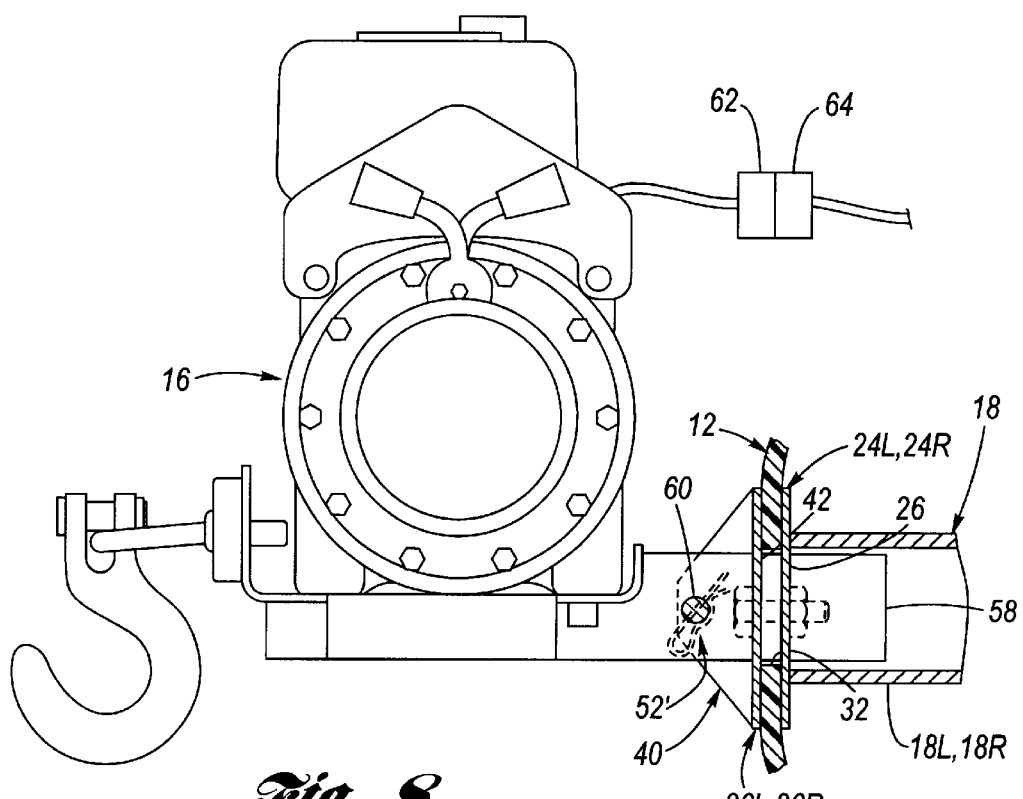
FIG. 8 is a partly sectional side view of a winch installed at a former recovery ring location according to the present invention.

As shown at FIGS. 5, 6 and 7, a recovery ring 14 is attached to each clevis 40, using a connector in the preferred form of a bolt and nut combination 52 (as shown at FIG. 7) or a pin and cotter pin combination (see 52' at FIG. 8) passing through the mounting holes 46 of the clevis and through the ring holes 56 of the recovery rings and secures at outside of the ring holes to thereby pivotally attach the recovery ring to the clevis.

In the event a winch 16 is needed, the user removes a selected one of the recovery rings 14 (depending on which side of the vehicle is more apt to provide winching success). Next, the user places the stinger 58 of the winch through the aligned bracket, bumper and plate apertures 42, 32, 26. The stinger 58 has a securement hole 60, and the connector 52, 52' (a pin and cotter pin combination being shown) of the (now removed) recovery ring is then placed through the mounting holes 46 of the clevis 40 and the securement hole to thereby securely hold the winch in place with respect to the vehicle frame 18. It will be noted that the winch 16 is stabilized relative to the selected left or right frame rail 18L, 18R of the motor vehicle frame 18 via a slidable, yet snug fit between the stinger 58 with the two aligned and spaced apart plate and bracket apertures 26, 42. In this regard, the dimensions of the plate and bracket apertures 26, 42 are commensurate to the dimensions of the stinger 58, as for example each having a mutually mating square cross-section. The user then connects an electrical connector 62 of the winch 16 to an electrical connector 64 of the motor vehicle. Thereupon, the user actuates the winch 16 as needed, as for example to recover the motor vehicle for an untoward driving incident. When completed, the winch 16 is removed and again stored; and the recovery ring 14 is then reinstalled using the bolt and nut combination or pin and cotter pin combination.

It will be appreciated from the foregoing description that the integrated mounting system 10 provides a secure and sturdy connection of mounting rings and a winch with very little bracketing. Further, the installation process is facilitated, in that the front bumper is integrated into the mounting process. Since both the winch attachments afforded selectively at each of the left and right mounting brackets 36L, 36R are in line with the longitudinal frame rails 18L, 18R, the structure is inherently stronger than that of a center mounted trailer hitch winch connection, as depicted at FIG. 1, importantly with no mass addition penalty. Further, the present invention does not interfere with the approach angle of the motor vehicle, and thereby does not diminish the off road capability and performance of the motor vehicle. Because the winch 16 may be located at either of the left and right mounting brackets 36L, 36R, an increased winch optimization is provided in those situations in which space available for winch operation is confined.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A motor vehicle integrated mounting system, comprising:
   a left frame rail having a forward end and an interior space;
   a right frame rail having a forward end and an interior space;
   a left mounting plate attached to said forward end of said left frame rail, said left mounting plate having a plate aperture formed therein which communicates with said interior space of said left frame rail, said left mounting plate having a plurality of attachment holes formed therein;
   a right mounting plate attached to said forward end of said right frame rail, said right mounting plate having a plate aperture formed therein which communicates with said interior space of said right frame rail, said right mounting plate having a plurality of attachment holes formed therein;
   a bumper having a pair of bumper apertures formed therein, said bumper further having a plurality of attachment holes formed therein;
   a left mounting bracket having a bracket aperture formed therein, said left mounting bracket further having a plurality of attachment holes formed therein;
   a right mounting bracket having a bracket aperture formed therein, said right mounting bracket further having a plurality of attachment holes formed therein; and
   a plurality of fasteners interfacing with said plurality of attachment holes to connect each of said left and right mounting brackets to a respective left and right mounting plate with said bumper being located therebetween, wherein the plate aperture of said left mounting plate is aligned with one bumper aperture and also aligned with the bracket aperture of the left mounting bracket, and wherein the plate aperture of said right mounting plate is aligned with the other bumper aperture and also aligned with the bracket aperture of the right mounting bracket.

2. The system of claim 1, wherein each said plate aperture and each said bracket aperture is identically sized with each other, and wherein each said bumper aperture is sized at least as large as said plate and bracket apertures.

3. The system of claim 2, wherein each of said left and right mounting brackets comprises:
   a planar base; and
   a clevis connected with said base in upstanding, perpendicular relation thereto, wherein said clevis comprises a pair of projections, wherein said bracket aperture is located between said projections, each projection having a mounting hole formed therein.

4. The system of claim 3, further comprising:
   a pair of recovery rings; and
   a pair of connectors, one connector being located at each of said left and right mounting brackets, respectively;
   wherein each connector selectively connects a recovery ring to its respective mounting bracket of said left and right mounting brackets via pivotal interfacing with the mounting holes thereof.

5. The system of claim 4, further comprising a winch having a stinger, wherein said bracket and plate apertures are sized to snugly and slidably receive said stinger, and wherein said interior space freely receives said stinger.

6. The system of claim 5, wherein said stinger has a securement hole; further wherein when said stinger is received by the bracket and plate apertures associated with a selected one of said left and right mounting brackets, the recovery ring thereat is disconnected from its connector, and the connector is passed through said securement hole and the mounting holes to thereby attach the winch to the selected one of said left and right mounting brackets.

* * * * *